United States Patent
Yang et al.

(10) Patent No.: US 11,280,544 B2
(45) Date of Patent: Mar. 22, 2022

(54) FRONT PANEL ASSEMBLY OF DRAWER OF REFRIGERATOR, DRAWER OF REFRIGERATOR, AND REFRIGERATOR

(71) Applicants: QINGDAO HAIER REFRIGERATOR CO., LTD., Shandong (CN); HAIER SMART HOME CO., LTD., Shandong (CN)

(72) Inventors: Falin Yang, Qingdao (CN); Shufei Ren, Qingdao (CN); Jinqiang Dou, Qingdao (CN); Mingkun Liu, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 0 days.

(21) Appl. No.: 17/436,968

(22) PCT Filed: Aug. 29, 2019

(86) PCT No.: PCT/CN2019/103288
§ 371 (c)(1),
(2) Date: Sep. 7, 2021

(87) PCT Pub. No.: WO2020/181736
PCT Pub. Date: Sep. 17, 2020

(65) Prior Publication Data
US 2022/0042738 A1    Feb. 10, 2022

(30) Foreign Application Priority Data
Mar. 8, 2019  (CN) .................. 201910177244.X

(51) Int. Cl.
*F25D 25/02*  (2006.01)
*F25D 27/00*  (2006.01)
(Continued)

(52) U.S. Cl.
CPC ............ *F25D 25/025* (2013.01); *F21V 11/16* (2013.01); *F21V 23/002* (2013.01);
(Continued)

(58) Field of Classification Search
CPC ........ F25D 25/025; F25D 27/00; F21V 11/16; F21V 23/002; F21V 33/0044; G02B 6/0055; G02B 6/0085; G02B 6/0088
(Continued)

(56) References Cited

U.S. PATENT DOCUMENTS

| 7,147,341 | B2 |  | 12/2006 | Nowak et al. |
| 11,035,531 | B1 | * | 6/2021 | Wanta ................. F21V 33/0012 |

(Continued)

FOREIGN PATENT DOCUMENTS

| CN | 101424768 A | 5/2009 |
| CN | 104422246 A | 3/2015 |

(Continued)

OTHER PUBLICATIONS

Written Opinion of the International Searching Authority for PCT/CN2019/103288 (ISA/CN) dated Feb. 5, 2019 (3 pages).
(Continued)

*Primary Examiner* — Bryon T Gyllstrom
(74) *Attorney, Agent, or Firm* — Alston & Bird LLP

(57) ABSTRACT

A front panel assembly of a drawer of a refrigerator, a drawer of a refrigerator and a refrigerator. The front panel assembly comprises a front panel body defining an accommodating cavity, and a light emitting mechanism provided in the accommodating cavity and comprising a light source, a light guide body and a reflecting member, wherein the light guide body is provided below the light source and has a slope, the reflecting member is provided obliquely below the slope, the front end face of the front panel body is provided with a light transmissive plate, and light rays emitted from the light
(Continued)

source are transmitted to the slope by means of the light guide body, are reflected by the reflecting member, and are then emitted out from the light transmissive plate. The drawer of the refrigerator comprises a drawer body defining a storage space and the front panel assembly provided in the front of the drawer body. The refrigerator has the drawer of the refrigerator. The front panel assembly of the drawer of the refrigerator is provided with a light emitting assembly, such that visual layering and a stereoscopic effect can be implemented, and the mounting and replacement process of the light source can be simplified.

13 Claims, 13 Drawing Sheets

(51) Int. Cl.
*F21V 8/00* (2006.01)
*F21V 33/00* (2006.01)
*F21V 23/00* (2015.01)
*F21V 11/16* (2006.01)

(52) U.S. Cl.
CPC .......... *F21V 33/0044* (2013.01); *F25D 27/00* (2013.01); *G02B 6/0055* (2013.01); *G02B 6/0085* (2013.01); *G02B 6/0088* (2013.01)

(58) Field of Classification Search
USPC ........................................... 362/92
See application file for complete search history.

(56) References Cited

U.S. PATENT DOCUMENTS

| | | | |
|---|---|---|---|
| 2014/0003090 A1* | 1/2014 | Chang | G02B 6/0091 362/612 |
| 2017/0314766 A1 | 11/2017 | Baek et al. | |
| 2018/0112910 A1* | 4/2018 | Alyanak | F25D 25/02 |
| 2018/0306971 A1* | 10/2018 | Conrad | F21S 9/02 |
| 2019/0017679 A1* | 1/2019 | Choi | F21V 7/0066 |
| 2019/0339003 A1* | 11/2019 | Signorino | F25D 23/06 |
| 2020/0208907 A1* | 7/2020 | Kim | F25D 25/04 |
| 2020/0341324 A1* | 10/2020 | Cui | G02B 6/0085 |
| 2020/0408462 A1* | 12/2020 | Feldmeyer | F25D 23/028 |
| 2021/0348829 A1* | 11/2021 | Kraemer | F25D 23/066 |

FOREIGN PATENT DOCUMENTS

| | | |
|---|---|---|
| CN | 105698476 A | 6/2016 |
| CN | 105972926 A | 9/2016 |
| CN | 206094732 U | 4/2017 |
| CN | 207649199 U | 7/2018 |
| CN | 109002231 A | 12/2018 |
| EP | 1645823 A2 | 4/2006 |
| EP | 1647767 A2 | 4/2006 |
| JP | 20108017 A | 1/2010 |
| KR | 20060007615 A | 1/2006 |

OTHER PUBLICATIONS

International Search Report for PCT/CN2019/103288 (ISA/CN) dated Dec. 5, 2019 with English translation (4 pages).
Search Report for China Application No. 201910177244X dated Mar. 8, 2019 (3 pages).

* cited by examiner

FRONT PANEL ASSEMBLY OF DRAWER OF REFRIGERATOR, DRAWER OF REFRIGERATOR, AND REFRIGERATOR

CROSS-REFERENCE TO RELATED APPLICATIONS

The present application is a national phase entry of International Application No. PCT/CN2019/103288, filed Aug. 29, 2019, which claims priority to Chinese Patent Application No. 201910177244.X, filed Mar. 8, 2019, which are incorporated herein by reference in their entirety.

FIELD OF THE INVENTION

The present invention relates to the technical field of freezing and refrigerating devices, in particular to a front panel assembly of a drawer of a refrigerator, a drawer of a refrigerator and a refrigerator.

BACKGROUND OF THE INVENTION

The refrigerator can keep food fresh and prolong the storage time of the food, and is a necessary household appliance. More and more refrigerators adopt a drawer type design. At present, the structural improvement of the drawer of the refrigerator is mainly improvement on drawer accessories, drawer interior lighting devices and the like, for example: a roller rail is disposed at the bottom of the drawer of the refrigerator, so that the drawer can be pulled and pushed conveniently; and a lighting lamp and the like are disposed at the inner wall of the side plate of the drawer body.

BRIEF DESCRIPTION OF THE INVENTION

One objective of the present invention is to provide a light emitting structure of a front panel assembly of a drawer of a refrigerator.

One further objective of the present invention is to enable the front panel assembly of the drawer to achieve a visual sense of layering and a stereoscopic effect.

Another further objective of the present invention is to simplify an installation and replacement process of a light source of the front panel assembly of the drawer.

Particularly, the present invention provides a front panel assembly of a drawer of a refrigerator, comprising:

a front panel body, defining an accommodating cavity; and a light emitting mechanism, disposed in the accommodating cavity, and including a light source, a light guide body and a reflector, wherein the light guide body is disposed below the light source and is provided with an inclined plane; the reflector is disposed obliquely below the inclined plane; wherein a front end face of the front panel body is provided with a light transmitting plate, and light emitted by the light source is transmitted by the light guide body to reach the inclined plane to be emitted out from the light transmitting plate after being reflected by the reflector.

Optionally, the light transmitting plate is vertically disposed. A horizontal distance between the inclined plane from a bottom edge thereof to a top edge thereof and the light transmitting plate is gradually increased, and light vertically reaches the inclined plane downwards, and then is emitted out from the light transmitting plate after being horizontally reflected forwards by the reflector.

Optionally, the inclined plane and the light transmitting plate form an acute angle in degrees of 20°-45°.

Optionally, the front end face of the front panel body is provided with a light-proof plate and the light transmitting plate disposed up and down. The light guide body includes a first light guide part and a second light guide part disposed up and down. The first light guide part is disposed corresponding to the light-proof plate, and the light source is arranged thereon. The second light guide part is disposed corresponding to the light transmitting plate and is provided with a vertical surface and the inclined plane. The vertical surface is attached to the light transmitting plate, and the inclined plane and the vertical surface form an acute angle.

Optionally, the front panel assembly further includes a supporting frame disposed in the accommodating cavity, fixed to the front panel body, configured to support the light guide body and comprising a first supporting part provided with an inclined structure matched with the inclined plane. The reflector is a reflecting film, and is attached to a lower surface of the inclined plane and/or an upper surface of the first supporting part.

Optionally, the front panel assembly further includes a lower trim strip provided with grooves opened forwards and downwards, and fixed to the supporting frame and the front panel body. The lower trim strip and at least one part of a lower surface of the first supporting part jointly close an opening located in a bottom of the front panel body, and a handle part with a downward opening is formed between the lower trim strip and the first supporting part, so that the front panel assembly is pulled conveniently forwards by the handle part.

Optionally, an inclination angle of the first supporting part is 20°-45°.

Optionally, the supporting frame further includes a second supporting part disposed above the first supporting part and configured to form an accommodating space in between together with the light guide body. A side opening corresponding to the accommodating space is formed on a side face of the front panel body, and the light source is placed in or taken out of the accommodating space through the side opening.

Optionally, the front panel assembly further includes a light uniformizing plate disposed in the accommodating space. The light source is a lamp strip or a lamp panel, and light emitted by the light source vertically enters the light guide body downwards to reach the inclined plane after passing through the light uniformizing plate.

Optionally, the front panel assembly further includes a heat dissipation piece disposed in the accommodating space and configured to dissipate heat from the light source and the light uniformizing plate; wherein a light source placing area is defined among the heat dissipation piece, the light uniformizing plate and the light guide body, and the light source is disposed in the light source placing area so as to limit the light source in a front-back direction.

Optionally, the front panel assembly further includes a cabling rack disposed corresponding to the side opening and provided with a main body part and an extending part. A first hole for access of a cable and a second hole for access of the light source are formed in the main body part, and the extending part and the second supporting part are fixed.

The present invention further provides a drawer of a refrigerator, including:

a drawer body, defining a storage space therein; and the foregoing front panel assembly disposed in front of the drawer body.

The present invention further provides a refrigerator provided with the forgoing drawer of the refrigerator.

According to the front panel assembly of the drawer of the refrigerator and the drawer of the refrigerator of the present invention, the accommodating cavity is defined in the front panel body, the light source, the light guide body and the reflector are disposed in the accommodating cavity, and the light transmitting plate is disposed on the front end face of the front panel body, so that light emitted by the light source is transmitted by the light guide body to reach the inclined plane and then to be emitted out from the light transmitting plate after being reflected by the reflector, and light emission of the front panel assembly of the drawer of the refrigerator is realized. Meanwhile, the front panel assembly of the drawer of the refrigerator of the present invention is disposed such that the light source is transmitted in the light guide body and then is emitted out after being reflected by the reflector, and the light emitting effect of the front panel assembly can be adjusted by adjusting each component of the light emitting mechanism.

Further, the light transmitting plate of the front panel assembly of the drawer of the refrigerator of the present invention is vertically disposed. The horizontal distance between the inclined plane from the bottom edge thereof to the top edge thereof and the light transmitting plate is gradually increased. The light vertically reaches the inclined plane downwards and then is emitted out from the light transmitting plate after being horizontally reflected forwards by the reflector. The front panel assembly of the drawer realizes a visual sense of layering and a stereoscopic effect by changing the longitudinal direction of a structural piece from the shallower to the deeper.

Further, the front panel assembly of the drawer of the refrigerator of the present invention utilizes the supporting frame provided with the inclined structure matched with the inclined plane of the light guide body to fix the light guide body, so as to ensure position stability of the light guide body, and utilizes the reflecting film for reflection, so as to realize low cost and easy assembling. Moreover, the reflecting effect of the reflecting film can be made more stable by the supporting frame.

Further, the accommodating space is formed between the supporting frame and the light guide body of the front panel assembly of the drawer of the refrigerator of the present invention, so that the light source is convenient to place in and take out, and the light source can be easily and conveniently installed and replaced.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION

Figure 1:
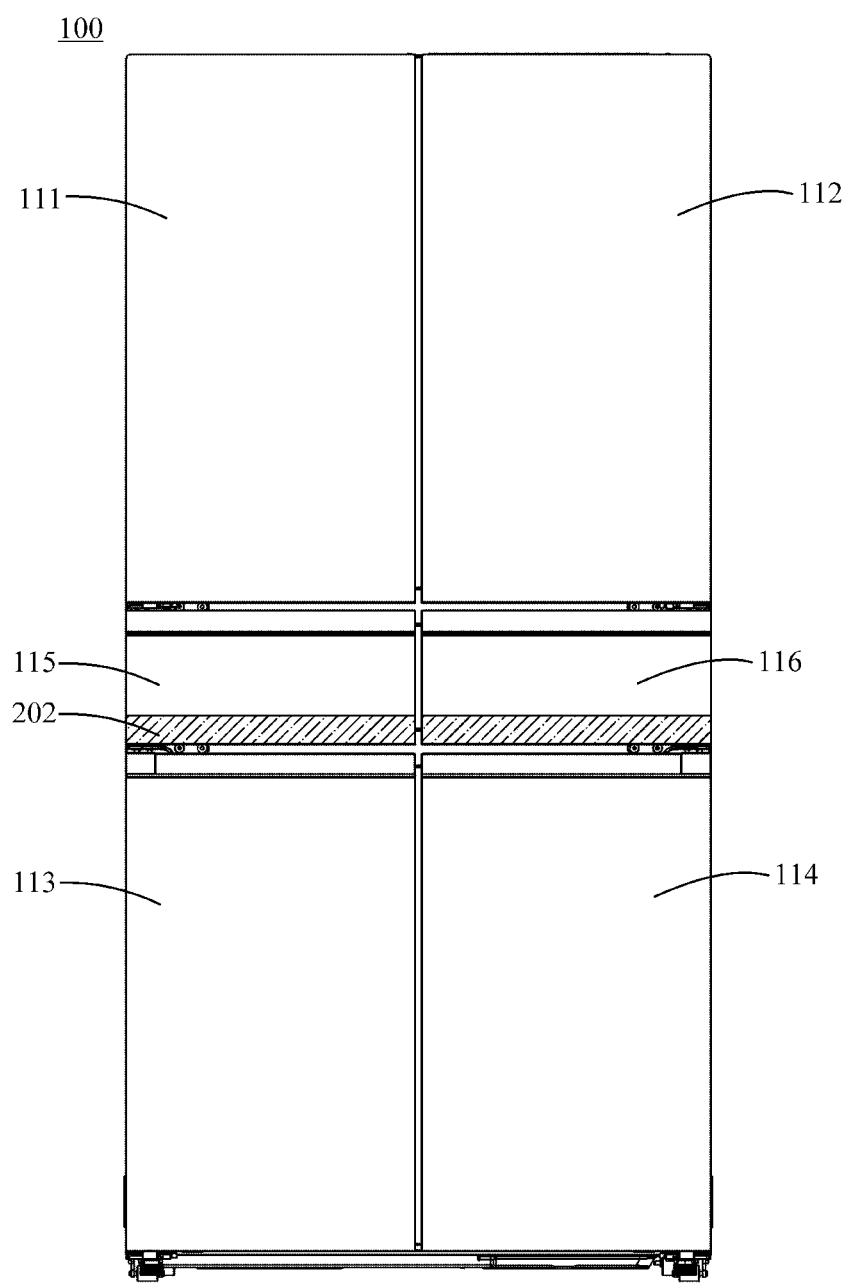
FIG. 1 is a schematic front view of a refrigerator according to one embodiment of the present invention.
Figure 2:
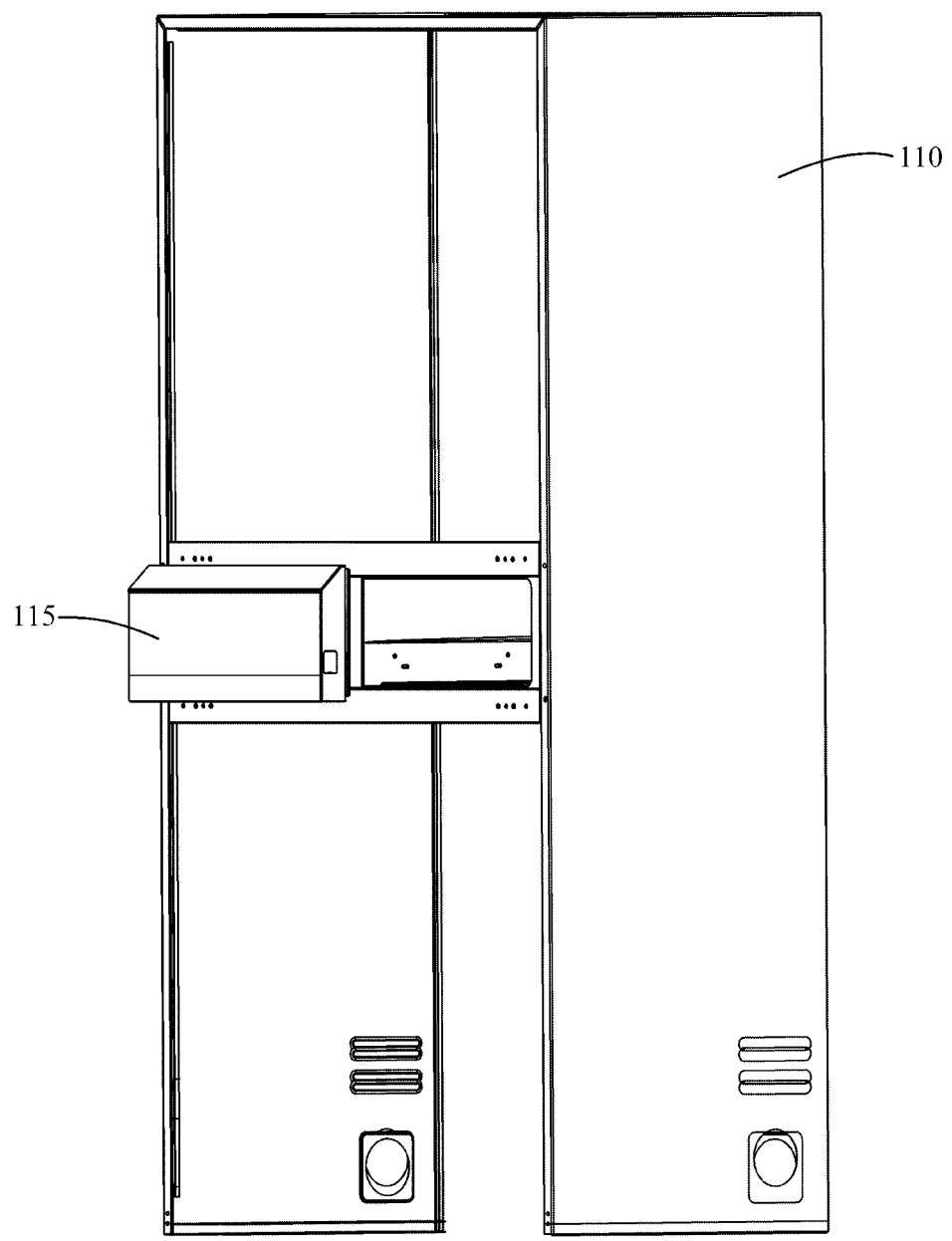
FIG. 2 is a schematic perspective view of a refrigerator body and a first drawer of the refrigerator shown in FIG. 1.
Figure 3:
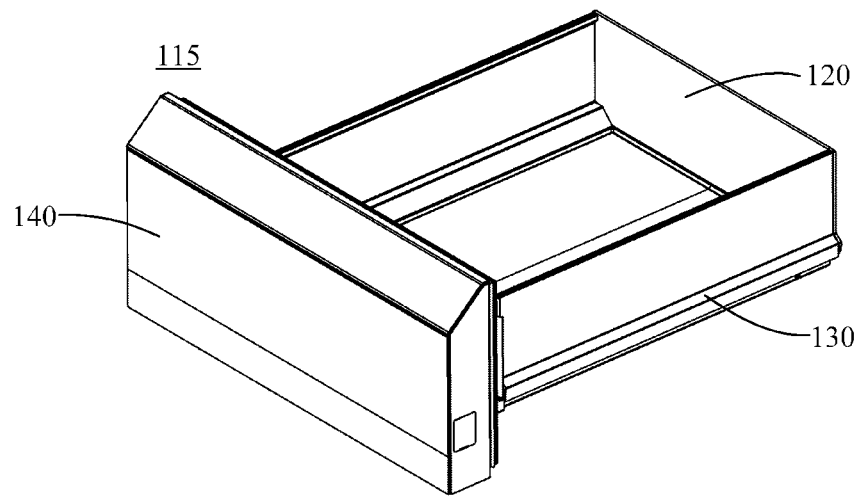
FIG. 3 is a schematic perspective view of a drawer of the refrigerator shown in FIG. 1.
Figure 4:
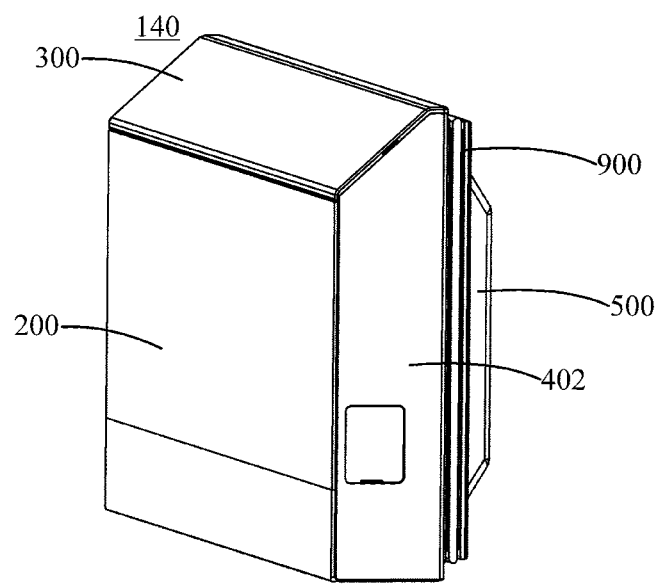
FIG. 4 is a schematic perspective view of a front panel assembly of the drawer of the refrigerator shown in FIG. 3.
Figure 5:
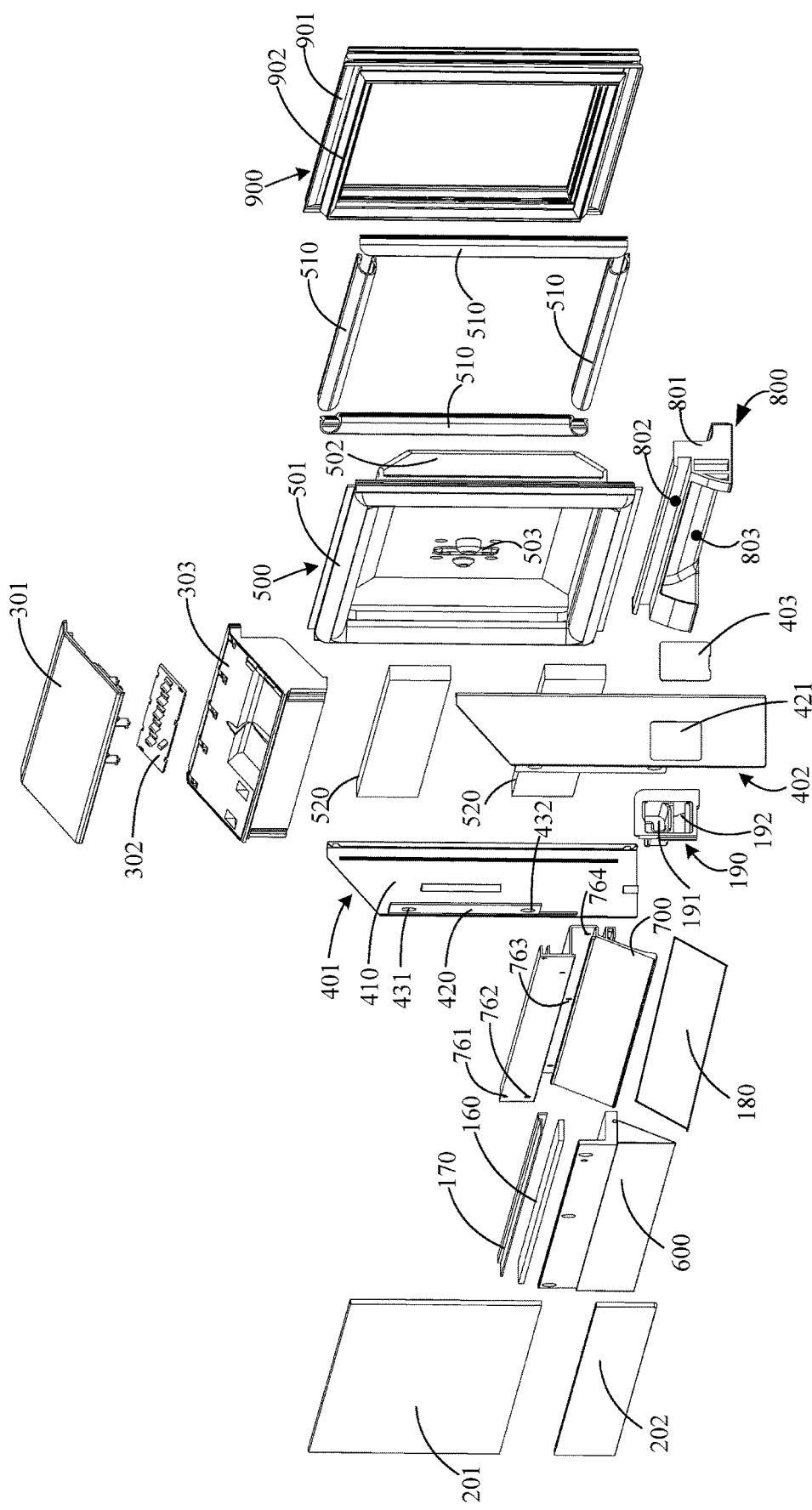
FIG. 5 is a schematic exploded view of the front panel assembly shown in FIG. 4.

FIG. 1 is a schematic front view of a refrigerator 100 according to one embodiment of the present invention. FIG. 2 is a schematic perspective view of a refrigerator body 110 and a first drawer 115 of the refrigerator 100 shown in FIG. 1. FIG. 3 is a schematic perspective view of a drawer 115 of the refrigerator 100 shown in FIG. 1. FIG. 4 is a schematic perspective view of a front panel assembly 140 shown in FIG. 3. FIG. 5 is a schematic exploded view of the front panel assembly 140 shown in FIG. 4. The refrigerator 100 of the embodiment of the present invention may generally include: a refrigerator body 110, a first door body 111, a second door body 112, a third door body 113, a fourth door body 114, a first drawer 115 and a second drawer 116. A plurality of storage compartments are defined within the refrigerator body 110. The first door body 111, the second door body 112, the third door body 113 and the fourth door body 114 are all rotary door bodies, and are pivotally disposed on the front side of one storage compartment through hinges respectively. Generally, the storage compartment corresponding to the first door body 111 and the second door body 112 is a refrigerating compartment, the storage compartment corresponding to the third door body 113 is a temperature changing compartment or a freezing compartment, and the storage compartment corresponding to the fourth door body 114 is a freezing compartment. The first drawer 115 and the second drawer 116 are disposed between the first door body 111 and the third door body 113, and between the second door body 112 and the fourth door body 114, respectively, as a refrigerating compartment or a temperature changing compartment.

The drawer 115 of the refrigerator 100 of the embodiment of the present invention includes a drawer body 120 and a front panel assembly 140. A storage space is defined within the drawer body 120. The drawer body 120 can be pulled to slide in the refrigerator body 110 through guide rails 130. The front panel assembly 140 is disposed in front of the drawer body 120.

In some embodiments, the front panel assembly 140 includes: a front panel body and a light emitting mechanism. The front panel body defines an accommodating cavity. The light emitting mechanism is disposed in the accommodating cavity and includes a light source 150, a light guide body 600 and a reflector 180. The light guide body 600 is disposed below the light source 150 and is provided with an inclined plane 602. The reflector 180 is disposed obliquely below the inclined plane 602. A front end face of the front panel body is provided with a light transmitting plate 202. Light emitted by the light source 150 is transmitted by the light guide body 600 to reach the inclined plane 602 and then to be emitted out from the light transmitting plate 202 after being reflected by the reflector 180. According to the front panel assembly 140 and the drawer 115 of the embodiment of the present invention, the accommodating cavity is defined in the front panel body, the light source 150, the light guide body 600 and the reflector 180 are disposed in the accommodating cavity, and the light transmitting plate 202 is disposed on the front end face of the front panel body, so that light emitted by the light source 150 is transmitted by the light guide body 600 to reach the inclined plane 602 and then to be emitted out from the light transmitting plate 202 after being reflected by the reflector 180, and light emission of the front panel assembly 140 is realized. Meanwhile, the front panel assembly 140 of the embodiment of the present invention is disposed such that the light source 150 is transmitted in the light guide body 600 and then is emitted out after being reflected by the reflector 180, and the light emitting effect of the front panel assembly 140 can be adjusted by adjusting each component of the light emitting mechanism.

Figure 19:
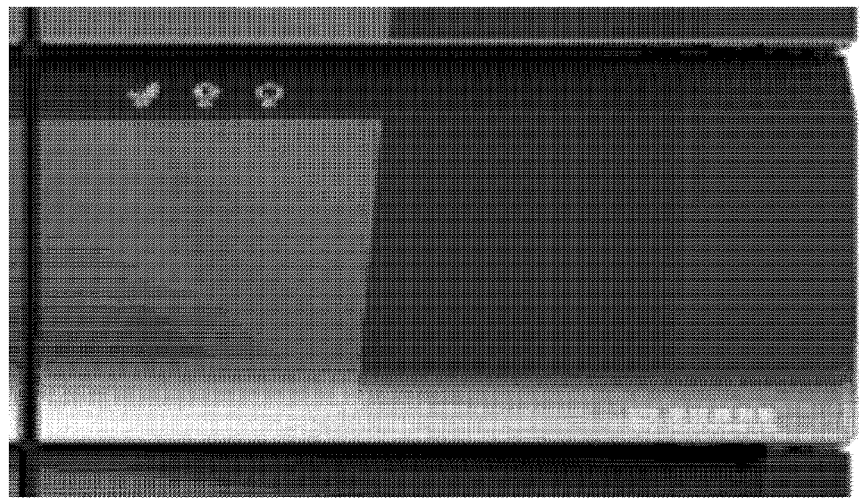
FIG. 19 is a schematic effect view of the drawer of the refrigerator shown in FIG. 4.

In some embodiments, the light transmitting plate 202 is vertically disposed. The horizontal distance between the inclined plane 602 from a bottom edge thereof to a top edge thereof and the light transmitting plate 202 is gradually increased. The light vertically reaches the inclined plane 602 downwards and then is emitted out from the light transmitting plate 202 after being horizontally reflected forwards by the reflector 180. The light transmitting plate 202 of the front panel assembly 140 of the embodiment of the present invention is vertically disposed. The horizontal distance between the inclined plane 602 from the bottom edge thereof to the top edge thereof and the light transmitting plate 202 is gradually increased (has an increasing tendency). The light vertically reaches the inclined plane 602 downwards and then is emitted out from the light transmitting plate 202 after being horizontally reflected forwards by the reflector 180. A longitudinal depth difference is produced by means of the structure of the inclined plane 602. Meanwhile, the inclined plane 602 can have the appearances of brushed leather lines, text, icons, etc., bringing a visual sense of layering. FIG. 19 is a schematic effect view of the front panel assembly 140 shown in FIG. 4. In one preferred embodiment, the inclined plane 602 and the light transmitting plate 202 form an acute angle $\theta$ in degrees of 20°-45°, for example, 20°, 25°, 35° and 42°.

In some embodiments, the front end face of the front panel body of the embodiment of the present invention is provided with a light-proof plate 201 and the light transmitting plate 202 disposed up and down. The light guide body 600 includes a first light guide part 631 and a second light guide part 632 disposed up and down, wherein the first light guide part 631 is disposed corresponding to the light-proof plate 201, and the light source 150 is arranged thereon. The second light guide part 632 is disposed corresponding to the light transmitting plate 202 and is provided with a vertical plane and the inclined plane. The vertical plane is attached to the light transmitting plate 202, and the inclined plane and the vertical plane form an acute angle, wherein the inclined plane of the second light guide part 632 constitutes the inclined plane 602 of the light guide body 600, and the light vertically reaches the inclined plane of the second light guide part 632 downwards and penetrates through the vertical plane of the second light guide part 632 and the light transmitting plate 202 to be emitted out after being horizontally reflected forwards by the reflector 180. The front end face of the front panel assembly 140 of the embodiment of the present invention is provided with the light-proof plate 201 and the light transmitting plate 202. Correspondingly, the light guide body 600 includes the first light guide part 631 and the second light guide part 632, making the boundary between a light transmitting part and a light-proof part obvious and improving the sense of layering, meanwhile ensuring that the whole area of the light transmitting part is luminous and there will be no situation where a local portion is completely grey and affects perception of users. In addition, the first light guide part 631 may also be configured to fix the light guide body 600.

In some embodiments, the front panel assembly 140 of the embodiment of the present invention further includes: a supporting frame 700, disposed in the accommodating cavity, fixed to the front panel body, and configured to support the light guide body 600. The supporting frame 700 includes a first supporting part 701 provided with an inclined structure, and the inclined structure of the first supporting part 701 is matched with the inclined plane 602. The reflector 180 is a reflecting film, located between the inclined plane 602 and the first supporting part 701 and attached to the inclined plane 602, or attached to the first supporting part 701, or is formed by carrying out surface treatment on an upper surface of the first supporting part 701. The front panel assembly 140 of the embodiment of the present invention utilizes the supporting frame 700 provided with the inclined structure matched with the inclined plane 602 of the light guide body 600 to fix the light guide body 600, so as to ensure position stability of the light guide body 600, and utilizes the reflecting film 180 for reflection, so as to realize low cost and easy assembling. Moreover, the reflecting effect of the reflecting film 180 can be made more stable by the supporting frame 700.

In some embodiments, the supporting frame 700 of the embodiment of the present invention further includes a second supporting part 702 disposed above the first supporting part 701 and configured to form an accommodating space in between together with the first light guide part 631. A side opening 421 corresponding to the accommodating space is formed on a side face of the front panel body, and the light source 150 is placed in or taken out of the accommodating space through the side opening 421. The accommodating space is formed between the supporting frame 700 and the light guide body 600 of the front panel assembly 140 of the embodiment of the present invention, so that the light source 150 is convenient to place in and take out, and the light source 150 can be easily and conveniently installed and replaced.

In some embodiments, the front panel assembly 140 of the embodiment of the present invention further includes a light uniformizing plate 160 disposed on the light guide body 600. The light source 150 is a lamp strip or a lamp panel, and light emitted by the light source 150 vertically enters the light guide body 600 downwards to reach the inclined plane 602 after passing through the light uniformizing plate 160.

In some embodiments, the front panel assembly 140 of the embodiment of the present invention further includes a heat dissipation piece 170 disposed in the accommodating space and configured to dissipate heat from the light source 150 and the light uniformizing plate 160, and a light source placing area 151 is defined among the heat dissipation piece 170, the light uniformizing plate 160 and the light guide body 600. The light source 150 is disposed in the light source placing area 151 so that the light source 150 is limited in a front-back direction. The front panel assembly 140 of the drawer 115 of the embodiment of the present invention is further provided with the heat dissipation piece 170 in the accommodating space to dissipate heat from the light source 150 and the light uniformizing plate 160, the situation that the service life of the light source 150 is affected due to the fact that the front panel assembly 140 is overheated is avoided, and meanwhile potential safety hazards can be avoided. In addition, the light source placing area 151 is defined by the heat dissipation piece 170, the light uniformizing plate 160 and the light guide body 600 together to limit the position of the light source 150 in the front-back direction.

In some embodiments, the front panel assembly 140 of embodiment of the present invention further includes a cabling rack 190 disposed corresponding to the side opening 421, and provided with a main body part 195 and an extending part 196. A first hole 191 for access of a cable and a second hole 192 for access of the light source 150 are formed in the main body part 195. The extending part 196 and the second supporting part 702 are fixed. In one embodiment, in order to ensure fixing stability of the cabling rack 190, a hook 194 is further formed on the cabling rack 190, the supporting frame 700 is provided with a notch 770, and the hook 194 fits in the notch 770.

In some embodiments, the front panel assembly 140 of the embodiment of the present invention further includes a lower trim strip 800 fixed to the supporting frame 700 and the front panel body. The lower trim strip 800 and at least one part of a lower surface of the first supporting part 701 jointly form a bottom of the front panel assembly 140. In one preferred embodiment, the lower trim strip 800 is provided with a groove 803 opened forwards and downwards. In this way, a handle part 804 with a downward opening is formed between the lower trim strip 800 and the first supporting part 701, so that the front panel assembly 140 is pulled conveniently forwards by the handle part 804. In one more preferred embodiment, an inclination angle of the first supporting part 701 is 20°-45°. The front panel assembly 140 of the embodiment of the present invention closes the opening through the lower trim strip 800 and the supporting frame 700, and meanwhile the handle part 804 is formed in between. This structure is quite ingenious and facilitates a user to pull the drawer 115. Meanwhile, the inclination angle of the first supporting part 701 takes into account both the light reflection and the hand feeling. An inclination included angle α between the first supporting part and the vertical plane is set to 20°-45°, for example, 20°, 25°, 35° and 42°.

Figure 6:
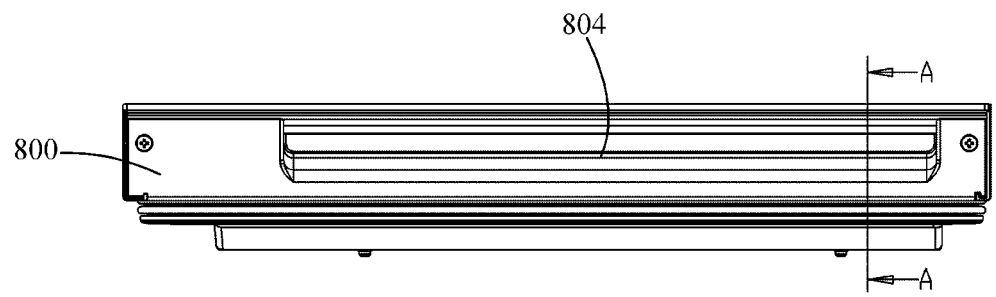
FIG. 6 is a schematic bottom view of the front panel assembly shown in FIG. 4.
Figure 7:
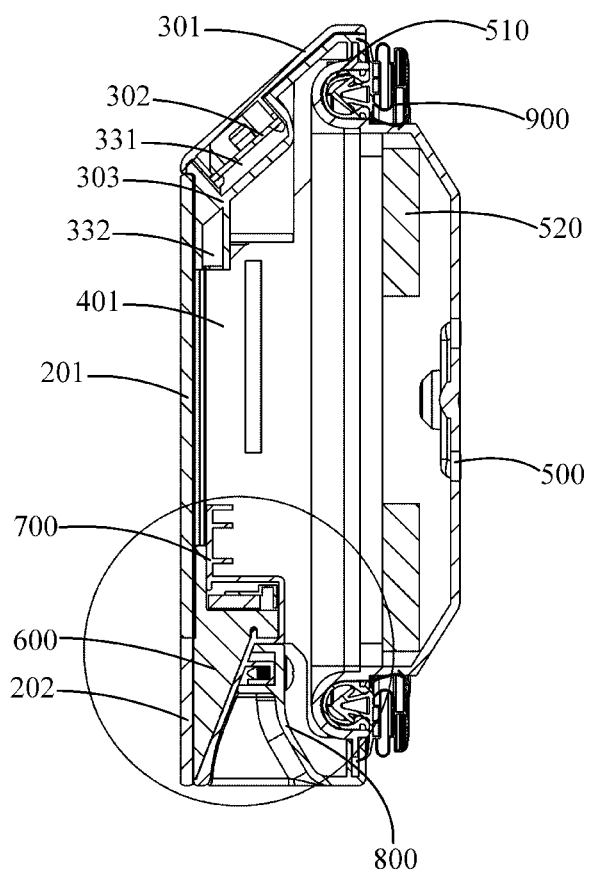
FIG. 7 is a schematic cross-sectional view of the front panel assembly shown in FIG. 6.
Figure 8:
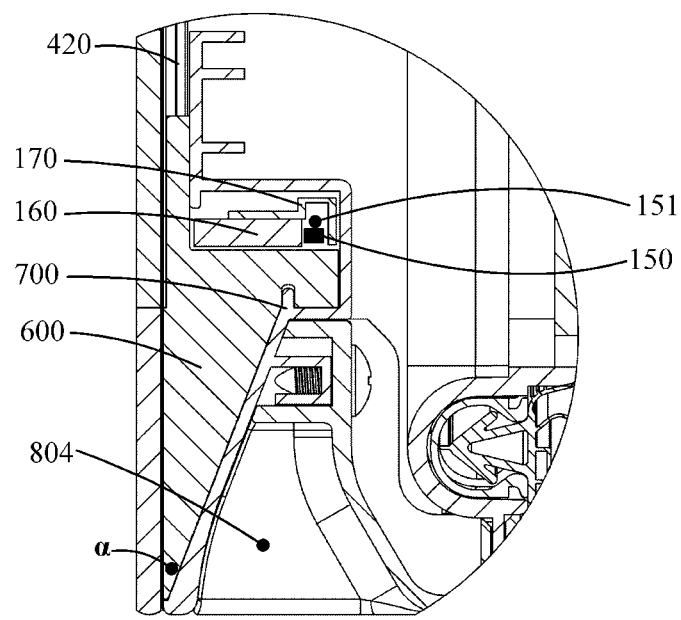
FIG. 8 is a schematic partial enlarged view of the front panel assembly shown in FIG. 7.
Figure 9:
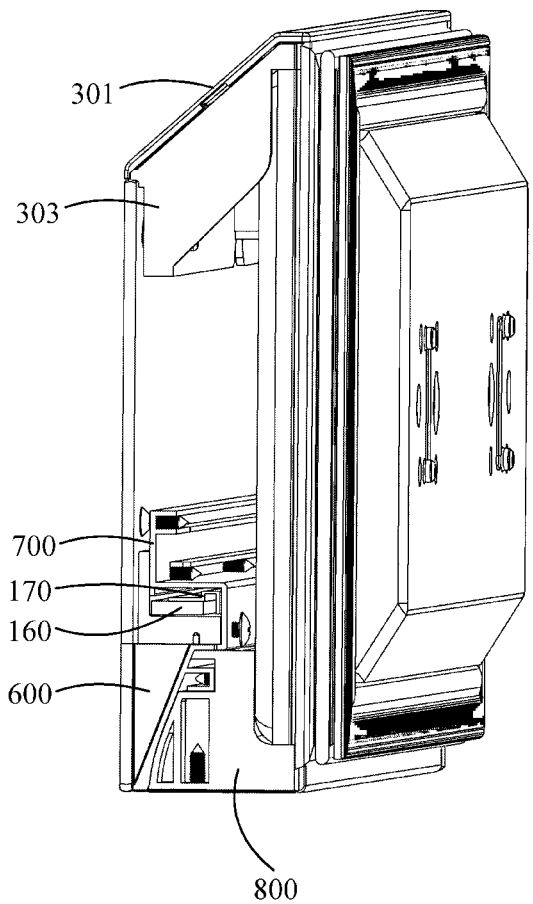
FIG. 9 is a schematic perspective view of some assemblies of the front panel assembly shown in FIG. 4.
Figure 10:
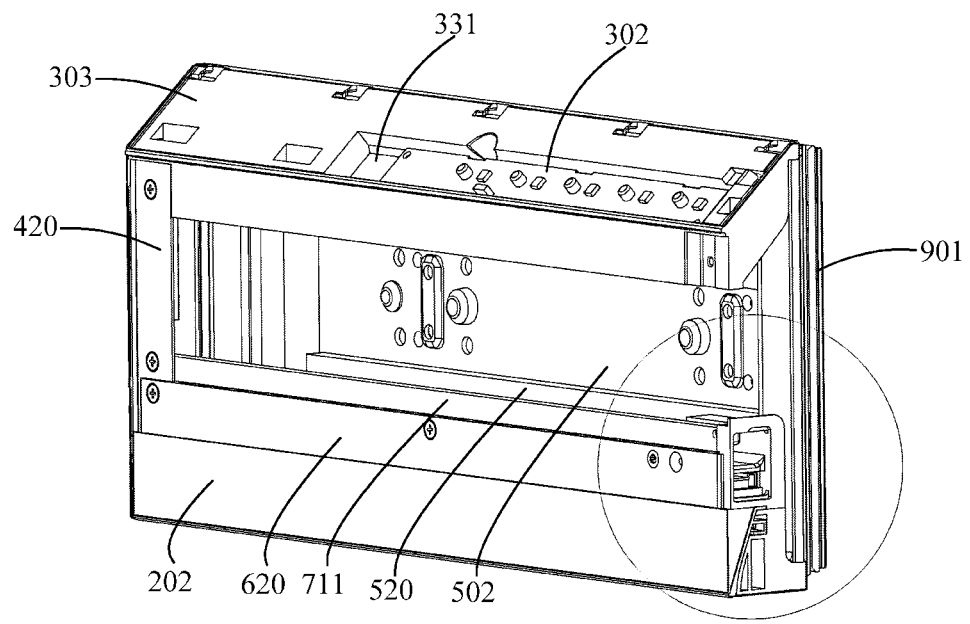
FIG. 10 is another schematic perspective view of some assemblies of the front panel assembly shown in FIG. 4.
Figure 11:
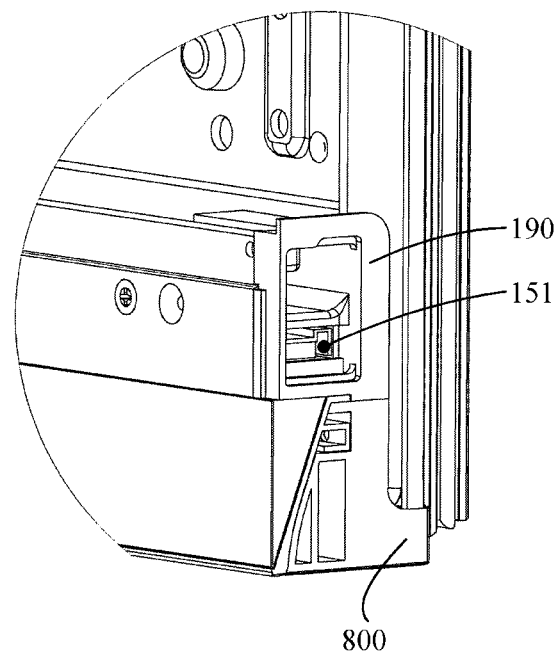
FIG. 11 is a schematic partial enlarged view of some assemblies of the front panel assembly shown in FIG. 10.

The front panel assembly 140 of the embodiment of the present invention includes the front panel body, a touchpad 302, a heat insulator 520, the light emitting mechanism, the supporting frame 700, the light uniformizing plate 160, the heat dissipation piece 170, the cabling rack 190 and the lower trim strip 800. FIG. 5 is a schematic exploded view of the front panel assembly 140 shown in FIG. 4. FIG. 6 is a schematic bottom view of the front panel assembly 140 shown in FIG. 4. FIG. 7 is a schematic cross-sectional view of the front panel assembly 140 shown in FIG. 6. FIG. 8 is a schematic partial enlarged view of the front panel assembly 140 shown in FIG. 7. FIG. 9 is a schematic perspective view of some assemblies of the front panel assembly 140 shown in FIG. 4. FIG. 10 is another schematic perspective view of some assemblies of the front panel assembly 140 shown in FIG. 4. FIG. 11 is a schematic partial enlarged view of some assemblies of the front panel assembly 140 shown in FIG. 10.

The front panel body includes a front end plate 200, a rear end plate 500, a fixing frame 900, a first side cover plate 401, a second side cover plate 402 and an upper cover mechanism 300. The first side cover plate 401 and the second side cover plate 402 are oppositely disposed, the front end plate 200 and the rear end plate 500 are disposed on a front side and a rear side respectively, and a first opening (not shown) and a second opening (not shown) are formed in a top and a bottom respectively. The upper cover mechanism 300 closes the first opening, and the supporting frame 700 and the lower trim strip 800 close the second opening.

The front end plate 200 is vertically disposed and includes the light-proof plate 201 and the light transmitting plate 202 located below the light-proof plate 201, and a light transmitting area is formed on the light transmitting plate 202. The front end plate 200 may be of an integrated structure, and may also be a split structure.

The rear end plate 500 includes a frame 501 and a protruding part 502 protruded backwards from the periphery of the frame 501. A groove (not shown) is formed in a back face of the frame 501. A plurality of assembling holes 503 are formed in the protruding part 502 for fixing the front panel assembly 140 to the guide rails 130.

The fixing frame 900 includes a frame body 901 and a frame protrusion 902 extending forwards from the frame body 901. The frame protrusion 902 is matched with the groove of the rear end plate 500. The fixing frame 900 is configured to seal the connection between the rear end plate 500 and other components of the front panel body, and a sealing strip 510 is further disposed between the groove of the rear end plate 500 and the frame protrusion 902 to enhance sealing. Further, in order to enhance the heat insulating performance of the front panel assembly 140, the heat insulator 520, such as two heat insulating blocks, is disposed in the protruding part 502.

The first side cover plate 401 and the second side cover plate 402 each include a side cover plate body 410 and a side cover plate extending part 420. The side cover plate bodies 410 of the first side cover plate 401 and the second side cover plate 402 are disposed relatively in parallel. Each side cover plate extending part 420 is formed by extending from the side cover plate body 410 on one side toward the side cover plate body 410 on the opposite side. A first fixing hole 431 and a second fixing hole 432 are respectively formed in the side cover plate extending part 420. The first side cover plate 401 and the second side cover plate 402 are fixed to the upper cover mechanism 300 through the first fixing hole 431, and the first side cover plate 401 and the second side cover plate 402 are fixed to the supporting frame 700 through the second fixing hole 432. The side opening 421 is formed in the side cover plate body 410 of the second side cover plate 402 for placement-in of the light source 150 and introduction of the cable. A sealing plate 403 is further disposed on the side cover plate body 410 of the second side cover plate 402, and configured to seal the side opening 421 after the light source 150 and the cable are placed therein.

Figure 12:
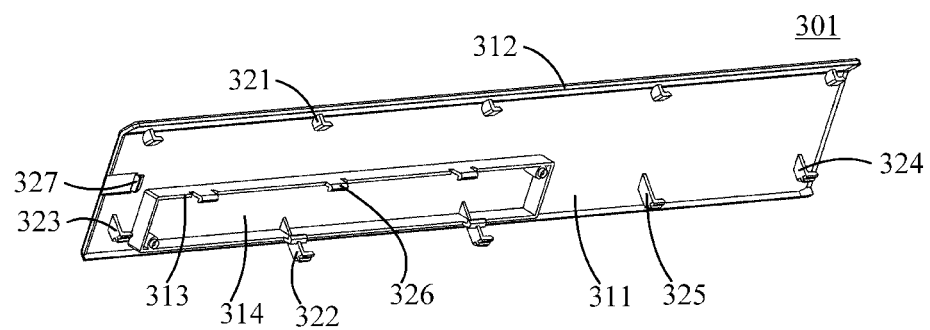
FIG. 12 is a schematic perspective view of an upper cover plate of the front panel assembly shown in FIG. 4.
Figure 13:
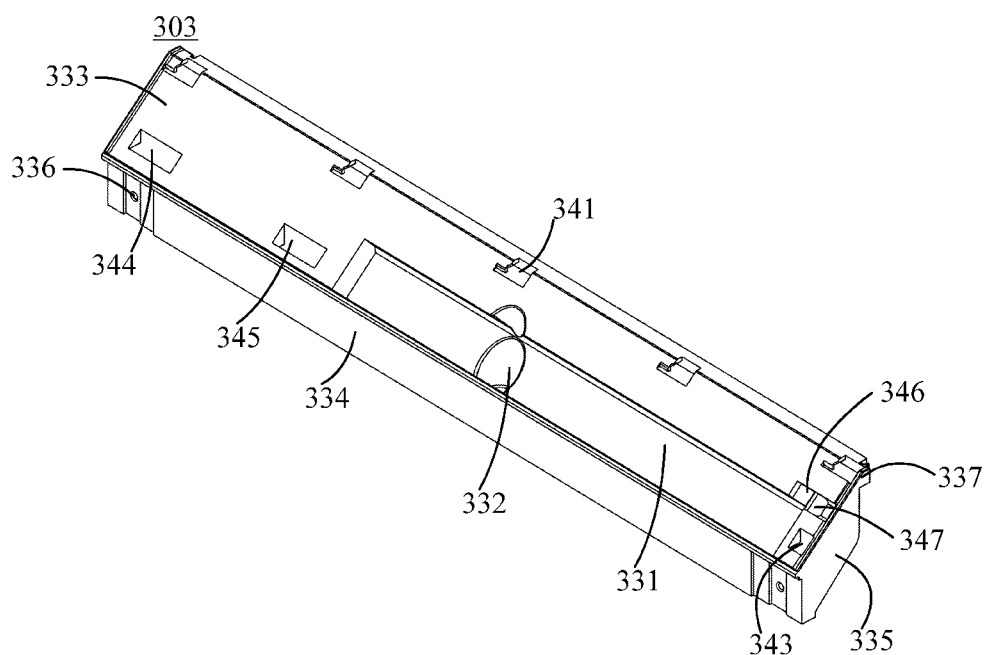
FIG. 13 is a schematic perspective view of an upper cover bracket of the front panel assembly shown in FIG. 4.
Figure 14:
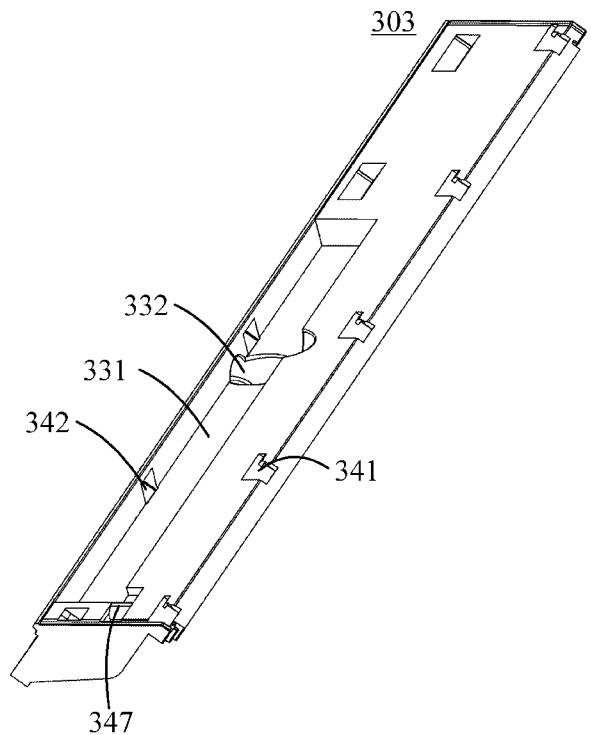
FIG. 14 is another schematic perspective view of the upper cover bracket of the front panel assembly shown in FIG. 13.

The upper cover mechanism 300 includes an upper cover plate 301 and an upper cover bracket 303. FIG. 12 is a schematic perspective view of the upper cover plate 301. FIG. 13 is a schematic perspective view of the upper cover bracket 303. FIG. 14 is another schematic perspective view of the upper cover bracket 303.

The upper cover plate 301 is provided with an upper cover plate body 311 and an upper cover plate extending part 312. The upper cover plate body 311 fully or partially forms a touch area on an outer surface thereof, and a rib 313 is formed in a downward extending manner at a position, corresponding to the touch area, of the inner surface thereof. The rib 313 defines a groove 314. Meanwhile, a plurality of sixth fixing hooks 326 are formed at intervals on the inner wall of the rib 313, and the touchpad 302 is fixed in the groove 314 via the plurality of sixth fixing hooks 326.

The upper cover bracket 303 is provided with a bracket top plate 333, a bracket front wall plate 334, a bracket side wall plate 335, and a bracket extending part 337. A recess 331 is formed in the position, corresponding to the groove 314 of the upper cover plate 301, on the bracket top plate 333. The recess 331 wraps the groove 314 of the upper cover plate 301 and the touchpad 302. A top face of the bracket top plate 333 is of an inclined structure, and forms an acute angle together with the horizontal plane, and the top face gradually seal the first opening upwards from the front end plate 200 to the rear end plate 500. The upper cover plate body 311 is matched with the top face of the bracket top plate 333 and is also obliquely disposed. A cabling hole 332 is also formed in the recess 331 in a penetrating manner for introducing the cable to supply power, signals and the like to the touchpad 302. A fixing hole 336 is formed in the bracket front wall plate 334. The first side cover plate 401, the second side cover plate 402 and the upper cover bracket 303 are fixed through the first fixing hole 431 in the side cover plate extending part 420 and the fixing hole 336 in the upper cover bracket 303. The bracket side wall plate 335 is configured to limit the distance between the front end plate 200 and the rear end plate 500. The bracket top plate 333 extends backwards to form the bracket extending part 337, and the bracket extending part 337 is disposed to be beneficial to fixing between the upper cover bracket 303 and the rear end plate 500.

The upper cover plate 301 and the upper cover bracket 303 are fixed by disposing a plurality of clamping structures. An intersection of the upper cover plate body 311 and the upper cover plate extending part 312 extends downwards at intervals in a length direction to form a plurality of first fixing hooks 321. Correspondingly, first fixing holes 341 are formed in the positions, corresponding to the first fixing hooks 321 respectively, at the intersection of the bracket top plate 333 and the bracket extending part 337. The upper cover plate body 311 extends downwards at intervals in a length direction at a position, close to an outer wall of the front end plate 200, of the rib 313 to form two second fixing hooks 322. Correspondingly, second fixing holes 342 are formed in positions, corresponding to the second fixing hooks 322 respectively, of the recess 331 of the bracket top plate 333. The other side, away from the upper cover plate extending part 312, of the upper cover plate body 311 extends downwards at intervals in the length direction to form a third fixing hook 323, a fourth fixing hook 324 and a fifth fixing hook 325, wherein the third fixing hook 323 and the fourth fixing hook 324 are arranged on a left side and a right side of the rib 313 respectively and are close to a left edge and a right edge of the upper cover plate body 311 respectively. The fifth fixing hook 325 is located between the rib 313 and the fourth fixing hook 324. Correspondingly, a third fixing hole 343, a fourth fixing hole 344 and a fifth fixing hole 345 are formed in positions, corresponding to the third fixing hook 323, the fourth fixing hook 324 and the fifth fixing hook 325, of the bracket top plate 333. The foregoing several clamping structures are mainly configured to ensure fixing of the upper cover plate 301 and the upper cover bracket 303 in the vertical direction. In addition, a limiting protrusion 327 is also formed on an inner surface of the upper cover plate body 311 in a width direction, and the limiting protrusion 327 can be a wedge-shaped protrusion. Correspondingly, the bracket top plate 333 forms a limiting groove 346 at a position corresponding to the limiting protrusion 327, and a limiting protrusion 347 for cooperating with the limiting protrusion 327 is disposed in the limiting groove 346. During installation, the several fixing hooks are controlled to be inserted into the corresponding fixing holes respectively and then slide to match and fix the two limiting protrusions. Understandably, two or more of the above clamping structures may be disposed to fix the upper cover plate 301 and the upper cover bracket 303.

Figure 15:
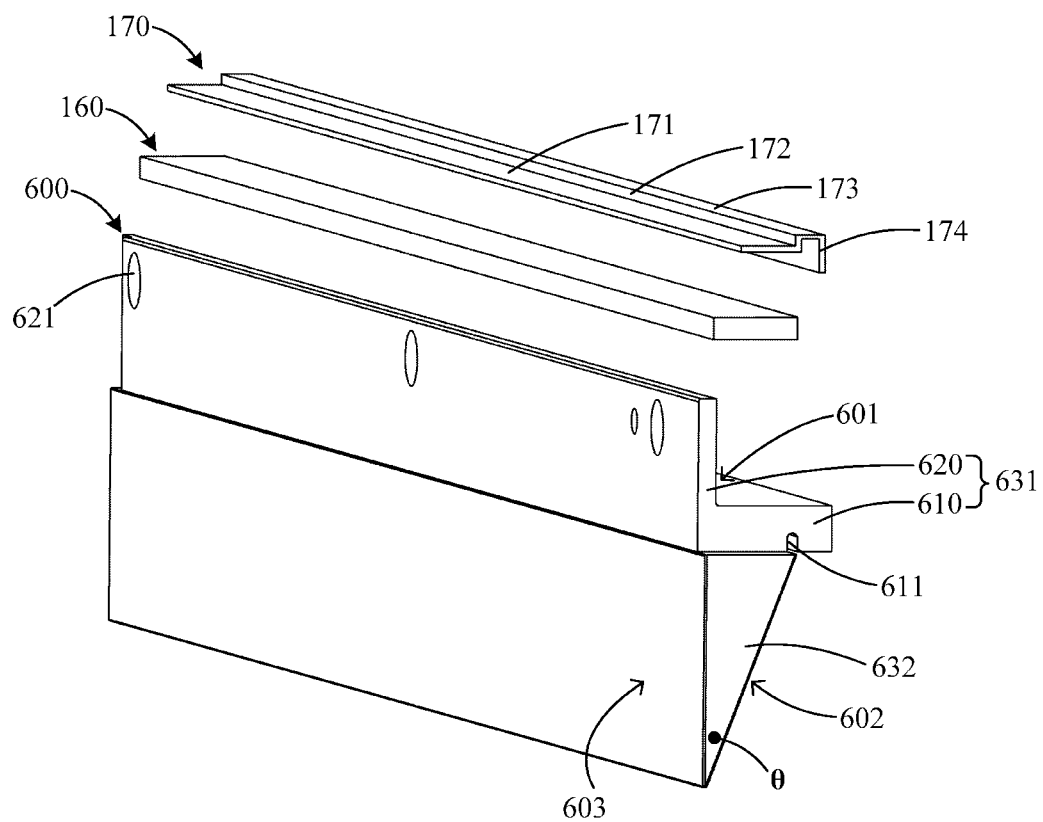
FIG. 15 is a schematic perspective view of a heat dissipation piece, a light uniformizing plate and a light guide body of the front panel assembly shown in FIG. 4.
Figure 16:
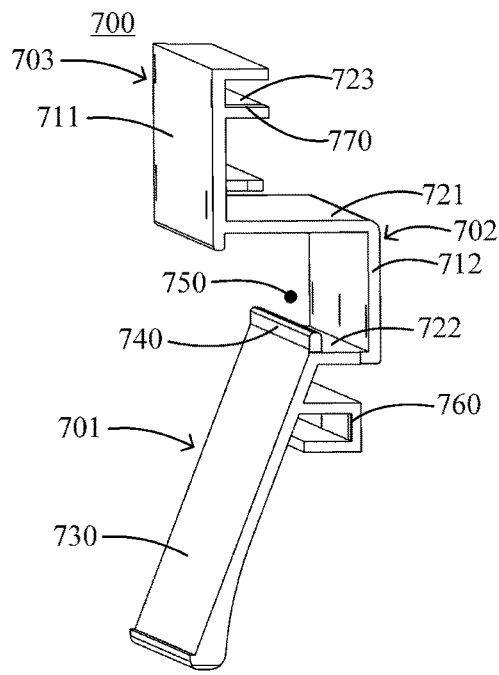
FIG. 16 is a schematic perspective view of a supporting frame of the front panel assembly shown in FIG. 4.

The light emitting mechanism includes the light source 150, the light guide body 600 and the reflecting film 180. The supporting frame 700 includes the first supporting part 701, the second supporting part 702 and a third supporting part 703. The specific structure of the light guide body 600 and the supporting frame 700 and their cooperation will be described below in turn. FIG. 15 is a schematic perspective view of the heat dissipation piece 170, the light uniformizing plate 160 and the light guide body 600. FIG. 16 is a schematic perspective view of the supporting frame 700.

The light guide body 600 is disposed below the light source 150 and is provided with the horizontal plane 601, the inclined plane 602 and the vertical plane 603. Light emitted by the light source 150 is emitted downwards from the horizontal plane 601 of the light guide body 600 to reach the inclined plane 602 of the light guide body 600, then is reflected forwards to reach the vertical plane 603 of the light guide body 600, and then is emitted from the light transmitting area. Specifically, the light guide body 600 includes the first light guide part 631 and the second light guide part 632, and the two light guide parts may be of an integrated structure or split structures, preferably the integrated structure. The material of the light guide body 600 may be transparent acryl. The first light guide part 631 is L-shaped in longitudinal section and is provided with a first connecting part 610 and a second connecting part 620. The first connecting part 610 is horizontally disposed, and an upper surface thereof forms the horizontal plane 601 of the light guide body 600 and is configured to place the light source 150, the light uniformizing plate 160 and the heat dissipation piece 170. A fixing hole (not shown) for fixing to the supporting frame 700 is formed in a rear side face of the first connecting part, and a groove 611 with a downward opening for matching with the supporting frame 700 is formed in a lower surface of the first connecting part. The second connecting part 620 is vertically disposed against the light-proof plate 201, and a fixing hole 621 for fixing to the first side cover plate 401 and the second side cover plate 402 is formed in a front-back direction thereof in a penetrating manner. The second light guide part 632 is a right triangle in longitudinal section, and is provided with a horizontal plane, a vertical plane, and an inclined plane. In one embodiment, an upper portion of the horizontal plane of the second light guide part 632 is provided with the first connecting part 610. The vertical plane of the second light guide part 632 corresponds to the light transmitting area. The inclined plane of the second light guide part 632 is the inclined plane 602 of the light guide body 600, and is matched with the first supporting part 701, and the reflecting film 180 is disposed between the two. When the front end plate 200 is of an integrated structure, the light-proof plate 201 is also used as a pasting area. Specifically, when the front end plate 200 is assembled, the light-proof plate 201 is pasted to the side cover plate extending part 420 and the second connecting part 620 so as to fix the front end plate 200.

The supporting frame 700 is made from aluminum alloy and is an integrally-formed workpiece which is provided with the first supporting part 701, the second supporting part 702 and the third supporting part 703, mainly including a first vertical plate 711, a first horizontal plate 721, a second vertical plate 712, a second horizontal plate 722 and an inclined plate 730 disposed in turn.

The first vertical plate 711 forms the third supporting part 703, and is provided with a first fixing hole 761 and a second fixing hole 762. The side cover plate extending part 420 and the third supporting part 703 are fixed via the second fixing hole 432 of the side cover plate extending part 420 and the first fixing hole 761 of the supporting frame 700. The second connecting part 620 and the third supporting part 703 are fixed through the fixing hole 621 of the second connecting part 620 and the second fixing hole 762 of the supporting frame 700. The first vertical plate 711 extends horizontally backwards at a central portion thereof to form a third horizontal plate 723 having a notch 770 on the third horizontal plate 723 for positioning of the cabling rack 190 and the supporting frame 700.

The first vertical plate 711 extends backwards at a bottom end thereof to form the first horizontal plate 721, and the other end of the first horizontal plate 721 extends downwards to form the second vertical plate 712. The second vertical plate 712 extends forwards at a bottom end thereof to form the second horizontal plate 722. The first horizontal plate 721, the second vertical plate 712, and the second horizontal plate 722 constitute the second supporting part 702 provided with an accommodating groove 750. A middle lower portion of the second connecting part 620, the first connecting part 610, a middle upper portion of the second vertical plate 712, and the first horizontal plate 721 collectively define an accommodating space for placing the light source 150, the light uniformizing plate 160 and the heat dissipation piece 170. A third fixing hole 763 is formed in the second vertical plate 712 in a penetrating manner, and the first connecting part 610 and the second supporting part 702 are fixed through the third fixing hole 763 of the supporting frame and the fixing hole of the first connecting part 610. A front end of the second horizontal plate 722 further extends upwards to form a vertical protrusion 740 for matching with the groove 611 of the first connecting part 610. In addition, a fourth fixing hole 764 is also formed in the second vertical plate 712 in a penetrating manner for fixing of the cabling rack 190 and the supporting frame 700.

The inclined plate 730 is formed in the manner that the other end of the second horizontal plate 722 obliquely extends forwards and downwards to constitute the first supporting part 701. A back face of the inclined plate 730 is further provided with a protruding part 760. A fifth fixing hole (not shown) is formed in the protruding part 760 for fixing of the lower trim strip 800 and the supporting frame 700.

The light source 150 is a lamp strip or lamp panel. The light uniformizing plate 160 is disposed on the first connecting part 610, and light emitted from the light source 150 vertically enters the light guide body 600 downwards after passing through the light uniformizing plate 160 and finally reaches the inclined plane 602.

The heat dissipation piece 170 is provided with a first horizontal part 171, a first vertical part 172 extending vertically upwards from a rear end of the first horizontal part 171, a second horizontal part 173 extending horizontally backwards from the other end of the first vertical part 172, and a second vertical part 174 extending vertically downwards from the other end of the second horizontal part 173 and terminating beyond the first horizontal part 171. The heat dissipation piece 170 cooperates with the light uniformizing plate 160 and the first connecting part 610 to define the light source placing area 151 of the light source 150. The size of the heat dissipation piece 170, the light uniformizing plate 160 and the second supporting part 702 is such that the width of the light source placing area 151 is the minimum assembling gap of the lamp strip 150, so that the two ends of the lamp strip 150 can be limited.

Figure 17:
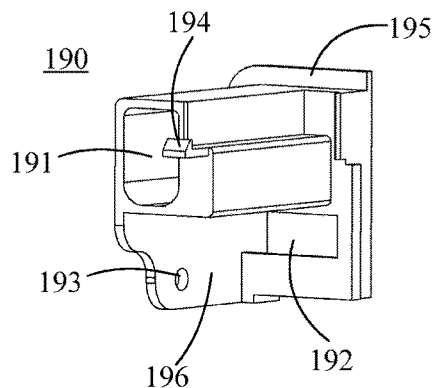
FIG. 17 is a schematic perspective view of a cabling rack of the front panel assembly shown in FIG. 4.

FIG. 17 is a schematic perspective view of a cabling rack 190 of the front panel assembly shown in FIG. 4. The cabling rack 190 includes a main body part 195 and an extending part 196. A first hole 191 for access of a cable and a second hole 192 for access of the light source 150 are formed in the main body part 195. A third hole 193 is formed in the extending part 196. In addition, an inner wall of the main body part 195 further extends leftwards to form a hook 194. The main body part 195 is disposed opposite to the side opening 421 of the second side cover plate. The hook 194 is clamped to the notch 770 to position the cabling rack 190 and the supporting frame 700. The third hole 193 is opposite to the fourth fixing hole 764 of the supporting frame 700. The cabling rack 190 and the supporting frame 700 are fixed via the third hole 193 and the fourth fixing hole 764 of the supporting frame 700.

Figure 18:
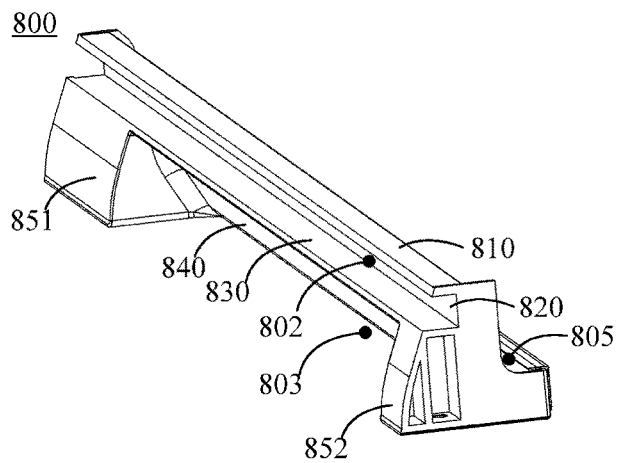
FIG. 18 is a schematic perspective view of a lower trim strip of the front panel assembly shown in FIG. 4.

FIG. 18 is a schematic perspective view of the lower trim strip 800 of the front panel assembly shown in FIG. 4. The lower trim strip 800 includes a lower trim strip body 801, and a first groove 802 opened forwards, a second groove 803 opened forwards and downwards and a third groove 805 opened backwards defined in the lower trim strip body 801. Specifically, a first horizontal part 810, a vertical part 820, a second horizontal part 830, an inclined part 840, a first side part 851 and a second side part 852 are formed on a front surface of the lower trim strip body 801.

The first horizontal part 810 constitutes a top face of the lower trim strip 800. The vertical part 820 is between the first horizontal part 810 and the second horizontal part 830, and the three jointly define the first groove 802. The protruding part 760 of the inclined plate 730 is wrapped within the first groove 802 of the lower trim strip 800. It may be that a fixing hole is formed in the position, corresponding to the fifth fixing hole of the supporting frame 700, of the vertical part 820, and a screw sequentially penetrates through the fixing hole and the fifth fixing hole of the supporting frame 700 to fix the supporting frame 700 and the lower trim strip 800. It also may be that the lower trim strip 800 is designed as an integrally plastic part, and a screw penetrates through the vertical part 820 and the fifth fixing hole of the supporting frame 700 to fix the supporting frame 700 and the lower trim strip 800.

The inclined part 840 is located below the second horizontal part in an inclined direction opposite to that of the first supporting part 701, and is provided with a first side part 851 and a second side part 852 at left and right sides thereof, respectively. The second horizontal part 830, the inclined part 840, the first side part 851 and the second side part 852 collectively define the second groove 803. A middle lower portion of the first supporting part 701, the second horizontal part 830, the inclined part 840, the first side part 851 and the second side part 852 jointly close the second opening, forming the handle part 804 opened downwards. The user can conveniently pull the front panel assembly 140 forwards and therefore pull the drawer 115 out by extending the hand into the handle part 804. In addition, fixing holes may be formed in bottom faces of the first side part 851 and the second side part 852.

The third groove 805 is formed in a rear surface of the lower trim strip body 801, and the frame 501 of the rear end plate 500 can fit in the third groove 805.

Figure 20:
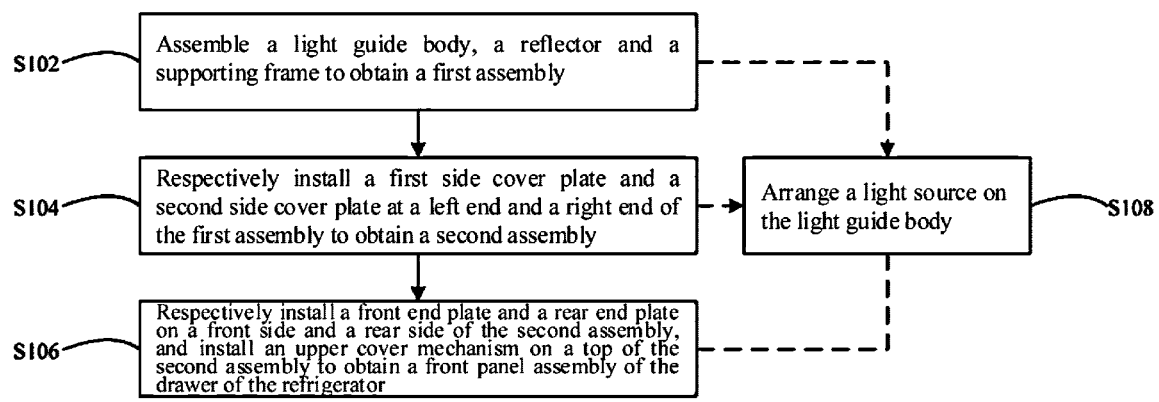
FIG. 20 is a schematic process view of an assembling method of a front panel assembly of a drawer of a refrigerator according to one embodiment of the present invention.

The present invention further provides an assembling method of a front panel assembly 140 of a drawer 115 of a refrigerator 100. FIG. 20 is a schematic process view of an assembling method of a front panel assembly 140 of a drawer 115 of a refrigerator 100 according to one embodiment of the present invention. The assembling method of the front panel assembly 140 of the embodiment of the present invention includes the steps:

S102: assembling a light guide body 600, a reflector 180 and a supporting frame 700 to obtain a first assembly, wherein the reflector 180 is located between the light guide body 600 and the supporting frame 700;

S104: respectively installing a first side cover plate 401 and a second side cover plate 402 at a left end and a right end of the assembled first assembly to obtain a second assembly; and S106: respectively installing a front end plate 200 and a rear end plate 500 on a front side and a rear side of the assembled second assembly, and installing an upper cover mechanism 300 on a top of the assembled second assembly to obtain the front panel assembly 140 of the drawer 115 of the refrigerator 100;

wherein any one of step S102, step S104 and step S106 further includes step S108: arranging a light source 150 on the light guide body 600 the light emitted from the light source 150 is transmitted by the light guide body 600, then is reflected by the reflector 180, and then to be emitted from a light transmitting area of the front end plate 200.

When the front panel assembly 140 of the embodiment of the present invention is assembled, the light source 150 can be installed in the previous step or in the later step, making replacement of the light source 150 quite convenient.

Figure 21:
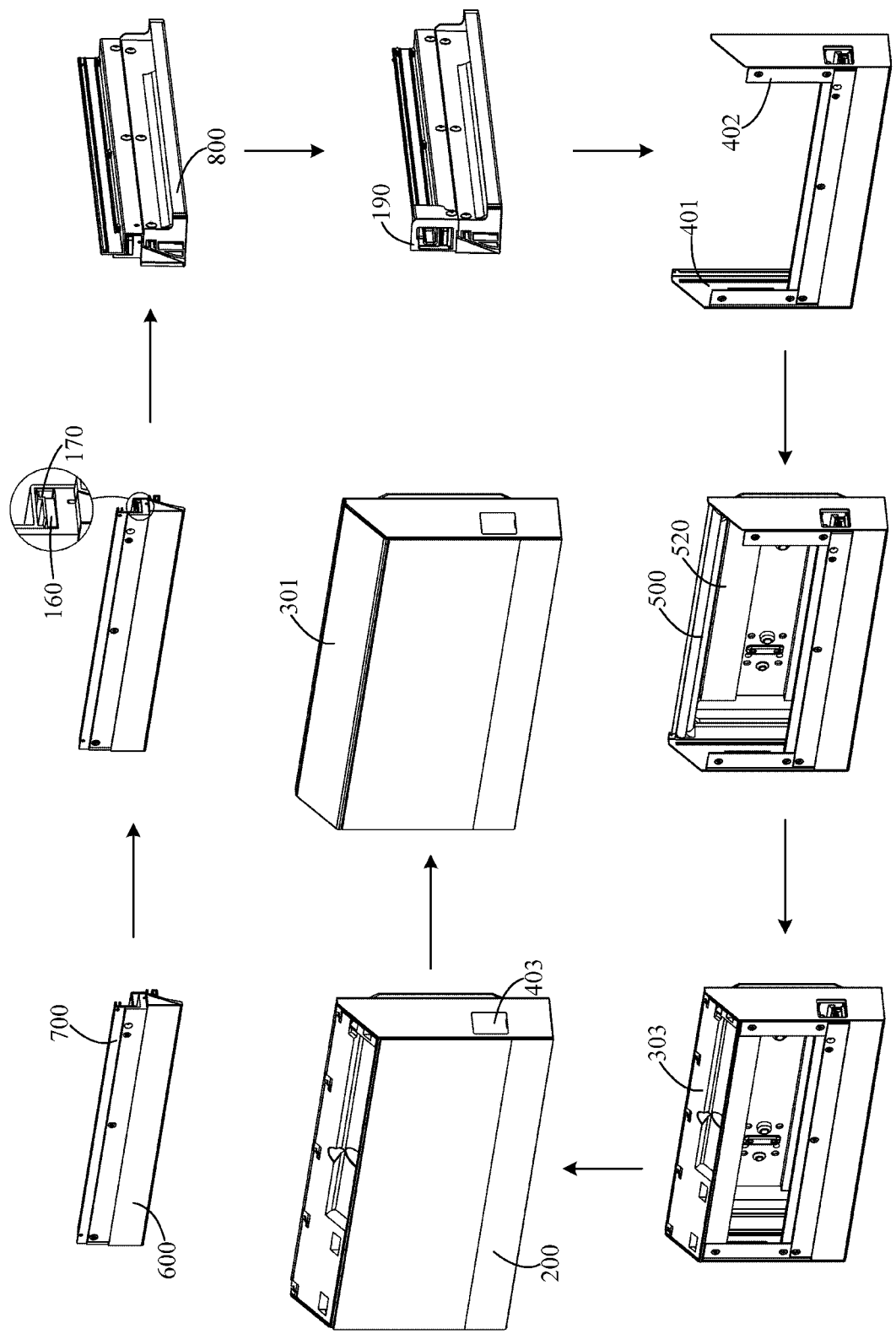
FIG. 21 is a schematic view of an assembling process of the front panel assembly shown in FIG. 20.

FIG. 21 is a schematic view of an assembling process of the front panel assembly 140 shown in FIG. 20 (a placing process of the light source 150 is not shown in the view). An assembling process of the front panel assembly 140 of the embodiment of the present invention includes the following steps:

1) The reflector 180, the light guide body 600 and the supporting frame 700 are assembled. A reflecting film 180 is attached to an inclined plane 602 of the light guide body 600, or surface treatment is carried out on an inclined plate 730 of the supporting frame 700 to form the reflecting film 180, or the reflecting film 180 is attached to an upper surface of the inclined plate 730 of the supporting frame 700. The inclined plane 602 of the light guide body 600 abuts against the inclined plate 730 of the supporting frame 700. A second connecting part 620 abuts against a first vertical plate 711. Fixing holes 621 of the second connecting part 620 are in one-to-one correspondence with second fixing holes 762 of the supporting frame, and these holes are fixed with screws. A groove 611 of a first connecting part 610 is matched with a vertical protrusion 740 of a second horizontal plate 722, fixing holes of the first connecting part 610 are in one-to-one correspondence with third fixing holes 763 of the supporting frame 700, and these holes are fixed with screws. In this way, a middle lower portion of the second connecting part 620, the first connecting part 610, a middle upper portion of a second vertical plate 712 and a first horizontal plate 721 jointly define an accommodating space.

2) A light uniformizing plate 160 and a heat dissipation piece 170 are installed. The light uniformizing plate 160 and the heat dissipation piece 170 are placed in the accommodating space. A bottom face of the light uniformizing plate 160 is attached to an upper surface of the first connecting part 610, and a front side face is attached to a rear side face of the second connecting part 620. A first horizontal part 171 of the heat dissipation piece 170 is attached to an upper surface of the light uniformizing plate 160, and a second vertical part 174 is attached to a front side face of the second vertical plate 712. In this way, the heat dissipation piece 170 is cooperated with the light uniformizing plate 160 and the first connecting part 610 to define a light source placing area 151.

3) A lower trim strip 800 and the supporting frame 700 are cooperatively fixed. A first groove 802 of the lower trim strip 800 wraps a protruding part 760 of the supporting frame 700. A vertical part 820 of the lower trim strip 800 and a fifth fixing hole of the supporting frame 700 are fixed by using screws, and screws are screwed upwards at fixing holes in bottom faces of a first side part 851 and a second side part 852.

4) A cabling rack 190 is installed. A hook 194 of the cabling rack 190 is clamped at a notch 770 of the supporting frame 700, and then the cabling rack 190 and the second vertical plate 712 are fixed via a third hole 193 of the cabling rack 190 and a fourth fixing hole 764 of the supporting frame by using screws, so that a first hole 191 and a second hole 192 of the cabling rack 190 are disposed in a left-right direction.

5) A first side cover plate 401 and a second side cover plate 402 are installed. The first side cover plate 401 is installed on a left side, and the second side cover plate 402 is installed on a right side. A side opening 421 of the second side cover plate is aligned with the first hole 191 and the second hole 192 of the cabling rack 190. Side cover plate extending parts 420 of the first side cover plate 401 and the second side cover plate 402 shield a middle upper portion of the first vertical plate 711 of the supporting frame 700, respectively. The side cover plate extending parts 420 and the first vertical plate 711 of the supporting frame 700 are fixed via second fixing holes 432 of the side cover plate extending parts and a first fixing hole 761 of the supporting frame.

6) A rear end plate 500 and a fixing frame 900 are installed. A frame 501 of the rear end plate 500 is fitted into a third groove 805 of the lower trim strip 800. A sealing strip 510 is added into a groove of the frame 501, and then the fixing frame 900 is installed, so that a frame protrusion 902 is fitted into the groove of the frame 501.

7) An upper cover bracket 303 is mounted. The upper cover bracket 303 is placed in an opening at the top formed among the first side cover plate 401, the rear end plate 500 and the second side cover plate 402, and the upper cover bracket 303 is fixed to the first side cover plate 401 and the second side cover plate 402 respectively via first fixing holes 431 of the side cover plate extending parts and a fixing hole 336 of the upper cover bracket. A bracket extending part 337 is matched with a top face of the rear end plate 500.

8) A front end plate 200 is installed. The front end plate 200 is glued to the side cover plate extending parts 420 and the second connecting part 620 by coating an inner side face of a light-proof plate 201 with glue, and a light transmitting plate 202 corresponds to a vertical plane of a second light guide part 632.

9) A light source 150 is installed. The light source 150 is placed into the light source placing area 151 through the side opening 421 of the second side cover plate and the second hole 192 of the cabling rack 190.

10) A sealing plate 403 is installed. The sealing plate 403 is installed at the side opening 421 of the second side cover plate, and assembling of the front panel assembly 140 is completed.

11) An upper cover plate 301 is installed. A touchpad 302 is fixed in a groove 314 of the upper cover plate 301 via a sixth fixing hook 326 of the upper cover plate 301. Then, a first fixing hook 321, a second fixing hook 322, a third fixing hook 323, a fourth fixing hook 324, and a fifth fixing hook 325 of the upper cover plate 301 are fitted into a first fixing hole 341, a second fixing hole 342, a third fixing hole 343, a fourth fixing hole 344, and a fifth fixing hole 345 of the upper cover bracket 303, respectively. A limiting protrusion 327 of the upper cover plate is fitted to a limiting protrusion 347 of the upper cover bracket, and therefore the upper cover plate 301 is fixed to the upper cover bracket 303. The touchpad 302 is located in a recess 331 of the upper cover bracket 303.

It should be understood that the light source 150 and the sealing plate 403 may also be installed after all other components are assembled, that is, the light source 150 and the sealing plate 403 are installed after the front end plate 200 and the upper cover plate 301 are installed. After the front panel assembly 140 is assembled, the front panel assembly 140 is fixed to the drawer body 120 to complete the installation of the drawer 115.

Figure 22:
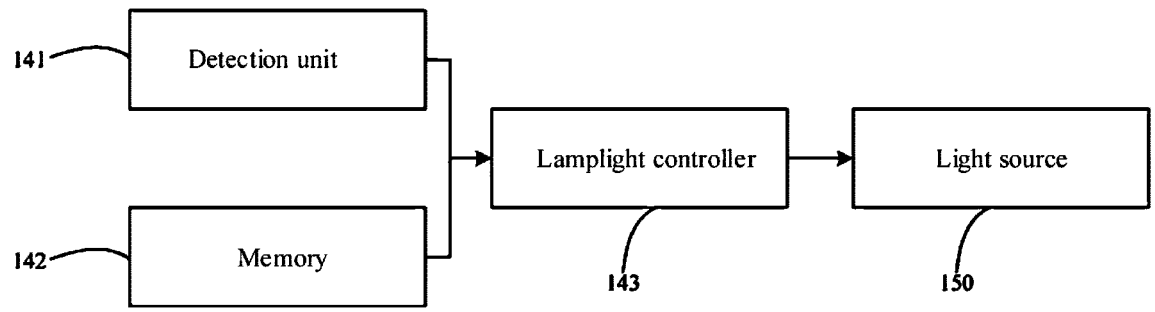
FIG. 22 is a schematic structural view of a control part of a drawer of a refrigerator according to one embodiment of the present invention.
Figure 23:
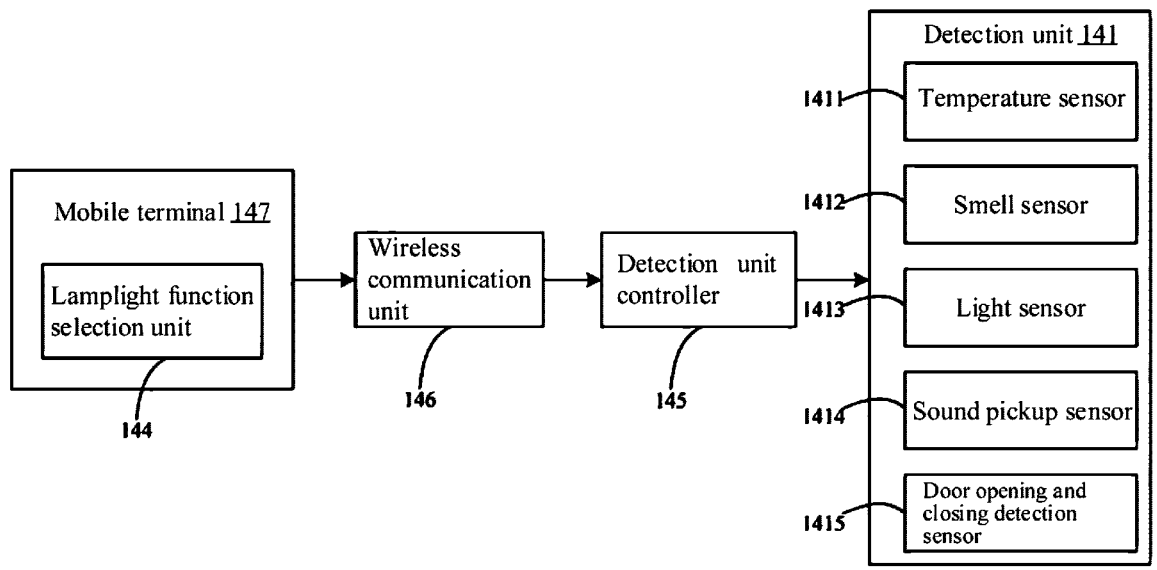
FIG. 23 is a schematic control view of a detection unit of a drawer of a refrigerator according to one embodiment of the present invention.

The present invention further provides a lamplight-controllable drawer 115 with the front panel assembly 140 as described above. FIG. 22 is a schematic structural view of a control part of a drawer 115 of a refrigerator 100 according to one embodiment of the present invention. FIG. 23 is a schematic control view of a detection unit 141 of a drawer 115 of a refrigerator 100 according to one embodiment of the present invention.

The drawer 115 includes a drawer body 120, a front panel assembly 140, one or more detection units 141, a memory 142 and a lamplight controller 143. The detection unit 141 is configured to detect the state of a storage space and/or the state of an environment where the refrigerator 100 is located in order to obtain one or more state information. The memory 142 is configured to store lamplight control information, wherein the lamplight control information is associated with control content of the light source 150 according to each state information or the combination of multiple state information. The lamplight controller 143 is configured to control one or more light sources 150 according to the state information detected by the detection unit 141 and the lamplight control information stored in the memory 142. The drawer 115 of the embodiment of the present invention can control the action of the light source 150 according to different state information by the lamplight controller 143, so as to realize the change of lamplight.

The lamplight control information includes color information and brightness information of lamplight realized by the action of the light source 150. The color of the lamplight can realize an RGB color mode outputting different parameters according to the magnitude of an applied voltage. The RGB color mode is a color based on spectrums corresponding to various permutations and combinations of red, green and blue light in a ratio between 0 and 255. The brightness of the lamplight may be achieved according to the magnitude of an applied current.

In some embodiments, the detection unit 141 of the embodiment of the present invention includes a temperature sensor 1411 disposed inside the storage space for detecting the temperature of the storage space. The state information includes a plurality of temperature information of the storage space. Color information of the lamplight realized by the light source 150 is correspondingly preset in the lamplight control information for each of the temperature information. Different temperatures in the drawer 115 may correspond to different colors, for example, low temperature corresponds to blue, and high temperature corresponds to red. In one implementation, the lamplight control information correspondingly presets the color information of the lamplight to change from a warm color system to a cold color system based on a plurality of temperature information from high to low temperature, and the color of the lamplight changes gradually, i.e., the temperature in the drawer 115 changes gradually.

In some embodiments, the detection unit 141 of the embodiment of the present invention includes a smell sensor 1412 disposed inside the storage space for detecting gas compositions of the storage space. The state information includes a plurality of gas information of the storage space. The color information of the lamplight realized by the light source 150 is correspondingly preset in the lamplight control information for the gas information. The color of the lamplight can be adjusted according to changes of values of the smell sensor 1412 to indicate the spoilage condition of food. For example, when food in the drawer 115 is normal, the color will show green, and when the food in the drawer 115 is rotting, the color will show red. In one implementation, the smell sensor 1412 is configured to detect gas compositions emitted by the food in a freshness period, a second freshness period and a past freshness period in the storage process in the storage space. The state information includes the gas information of the freshness period, the gas information of the second freshness period and the gas information of the past freshness period. The lamplight control information presets the color information of the lamplight for the gas information of the freshness period, the gas information of the second freshness period and the gas information of the past freshness period.

In some embodiments, the detection unit 141 of the embodiment of the present invention includes a light sensor 1413 disposed outside the refrigerator 100 for detecting the brightness of the environment where the refrigerator 100 is located. The state information includes a plurality of brightness information of the environment where the refrigerator 100 is located. Color information and brightness information of the lamplight realized by the light source 150 are preset in the lamplight control information for each brightness information. The light source 150 may adjust the brightness of lamplight display based on the ambient brightness sensed by the light sensor 1413. When the ambient brightness is high, the brightness of the lamplight is high correspondingly. When the ambient brightness is low, the brightness of the lamplight is low correspondingly. When the ambient brightness is extremely low, such as a night environment, the lamplight is displayed at an extremely low brightness, and the color of the lamplight may be set to yellow-white light for use as a small night lamp.

In some embodiments, the detection unit 141 of the embodiment of the present invention includes a sound pickup sensor 1414 disposed outside the refrigerator 100 for detecting a sound of an environment where the refrigerator 100 is located. The state information includes sound information of the environment where the refrigerator 100 is located. Color information and brightness information of the lamplight realized by the light source 150 are correspondingly preset in the lamplight control information for each sound information. When the sound of the surroundings of the refrigerator 100 changes, for example, music is played, and the like, the lamplight is rhythmically changed according to the tone.

In some embodiments, the detection unit 141 of the embodiment of the present invention includes a door opening and closing detection sensor 1415 for detecting an opening and closing condition of the drawer 115. The state information includes opening and closing information of the drawer 115. Color information and brightness information of the lamplight realized by the light source 150 are correspondingly preset in the lamplight control information for the opening and closing information. When the drawer 115 fails, for example, when a door body of the drawer 115 is not closed tightly, the lamplight can make a red lamplight flashing at a certain frequency to remind the user.

Understandably, one or more of the foregoing detection units 141 may be disposed for the same drawer 115. Each detection unit 141 may be provided with a respective light source 150, and multiple detection units 141 may share one or more light sources 150.

The drawer 115 of the embodiment of the present invention further includes: a lamplight function selection unit 144 and a detection unit controller 145. The lamplight function selection unit 144 is disposed on a main control display panel or a mobile terminal 147 of the refrigerator 100 for selecting predetermined functions realized by light changes, wherein each function is associated with one or more detection units 141. The detection unit controller 145 is configured to control one or more detection units 141 associated therewith based on a function selected by the lamplight function selection unit 144. Based on the light function selection unit 144, the user can control the different detection units 141 to be turned on or off as desired. In some embodiments, the lamplight function selection unit 144 is disposed on the mobile terminal 147. The drawer 115 further includes a wireless communication unit disposed in the front panel assembly 140 for wirelessly communicating with the mobile terminal 147 to receive the function selected by the lamplight function selection unit 144.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and recognized as covering all these other variations or modifications.

The invention claimed is:

1. A front panel assembly of a drawer of a refrigerator, comprising:
   a front panel body, defining an accommodating cavity; and
   a light emitting mechanism, disposed in the accommodating cavity, and comprising a light source, a light guide body and a reflector, wherein the light guide body is disposed below the light source and is provided with an inclined plane; the reflector is disposed obliquely below the inclined plane; wherein
   a front end face of the front panel body is provided with a light transmitting plate, and light emitted by the light source is transmitted by the light guide body to reach the inclined plane, and then to be emitted out from the light transmitting plate after being reflected by the reflector.

2. The front panel assembly of the drawer of the refrigerator according to claim 1, wherein
   the light transmitting plate is vertically disposed; and
   a horizontal distance between the inclined plane from a bottom edge thereof to a top edge thereof and the light transmitting plate is gradually increased, and the light vertically reaches the inclined plane downwards, and then is emitted out from the light transmitting plate after being horizontally reflected forwards by the reflector.

3. The front panel assembly of the drawer of the refrigerator according to claim 2, wherein
   the inclined plane and the light transmitting plate form an acute angle in degrees of 20°-45°.

4. The front panel assembly of the drawer of the refrigerator according to claim 2, wherein
   the front end face of the front panel body is provided with a light-proof plate and the light transmitting plate disposed up and down; and
   the light guide body comprises a first light guide part and a second light guide part disposed up and down; wherein
   the first light guide part is disposed corresponding to the light-proof plate, and the light source is arranged thereon; and
   the second light guide part is disposed corresponding to the light transmitting plate and is provided with a vertical plane and the inclined plane, the vertical plane is attached to the light transmitting plate, and the inclined plane and the vertical plane form an acute angle.

5. The front panel assembly of the drawer of the refrigerator according to claim 2, further comprising:
   a supporting frame, disposed in the accommodating cavity, fixed to the front panel body, configured to support the light guide body and comprising a first supporting part provided with an inclined structure matched with the inclined plane; and
   the reflector is a reflecting film, and is attached to a lower surface of the inclined plane and/or an upper surface of the first supporting part.

6. The front panel assembly of the drawer of the refrigerator according to claim 5, further comprising a lower trim strip, provided with grooves opened forwards and downwards and fixed to the supporting frame and the front panel body, wherein the lower trim strip and at least one part of a lower surface of the first supporting part jointly close an opening located in a bottom of the front panel body, and a handle part with a downward opening is formed between the lower trim strip and the first supporting part, so that the front panel assembly is pulled conveniently forwards by the handle part.

7. The front panel assembly of the drawer of the refrigerator according to claim 6, wherein
an inclination angle of the first supporting part is 20°-45°.

8. The front panel assembly of the drawer of the refrigerator according to claim 5, wherein
the supporting frame further comprises a second supporting part, disposed above the first supporting part and configured to form an accommodating space in between together with the light guide body; and
a side opening corresponding to the accommodating space is formed on a side face of the front panel body, and the light source is placed in or taken out of the accommodating space through the side opening.

9. The front panel assembly of the drawer of the refrigerator according to claim 8, further comprising:
a light uniformizing plate, disposed in the accommodating space;
wherein the light source is a lamp strip or a lamp panel, and the light emitted by the light source vertically enters the light guide body downwards to reach the inclined plane after passing through the light uniformizing plate.

10. The front panel assembly of the drawer of the refrigerator according to claim 9, further comprising:
a heat dissipation piece, disposed in the accommodating space and configured to dissipate heat from the light source and the light uniformizing plate; wherein a light source placing area is defined among the heat dissipation piece, the light uniformizing plate and the light guide body, and the light source is disposed in the light source placing area so as to be limited in a front-back direction.

11. The front panel assembly of the drawer of the refrigerator according to claim 10, further comprising:
a cabling rack, disposed corresponding to the side opening and provided with a main body part and an extending part, wherein a first hole for access of a cable and a second hole for access of the light source are formed in the main body part, and the extending part and the second supporting part are fixed.

12. A drawer of a refrigerator, comprising:
a drawer body, defining a storage space therein; and
the front panel assembly according to claim 1, disposed in front of the drawer body.

13. A refrigerator, provided with the drawer of the refrigerator according to claim 12.

\* \* \* \* \*